United States Patent [19]
Machbitz

[11] 4,429,792
[45] Feb. 7, 1984

[54] MEDICATION-DISPENSING CARD

[75] Inventor: Jacob M. Machbitz, Tiburon, Calif.

[73] Assignee: Medication Services, Inc., San Rafael, Calif.

[21] Appl. No.: 302,888

[22] Filed: Sep. 16, 1981

Related U.S. Application Data

[63] Continuation-in-part of Ser. No. 301,086, Sep. 11, 1981, abandoned.

[51] Int. Cl.³ .................. B65D 83/04; B65D 85/56
[52] U.S. Cl. .................. 206/531; 206/528; 206/534.1; 206/532
[58] Field of Search .................. 206/484, 528–532, 206/534, 534.1, 538, 539; 53/454, 453, 467, 411; 269/292, 900

[56] References Cited

U.S. PATENT DOCUMENTS

| | | | |
|---|---|---|---|
| 2,547,068 | 4/1951 | Way | 206/526 |
| 3,191,791 | 6/1965 | Jackson | 217/25.5 |
| 3,195,770 | 7/1965 | Robertson | 206/538 |
| 3,344,974 | 10/1967 | Bostrom | 206/518 X |
| 3,715,856 | 2/1973 | Borel | 206/820 X |
| 4,120,399 | 10/1978 | Clarke | 206/474 |
| 4,125,190 | 11/1978 | Davie, Jr. et al. | 206/532 |
| 4,211,329 | 7/1980 | Braverman | 206/534 |
| 4,254,871 | 3/1981 | Poore | 206/534 |
| 4,340,141 | 7/1982 | Fischer | 206/531 |

Primary Examiner—William T. Dixson, Jr.
Assistant Examiner—Brenda J. Ehrhardt
Attorney, Agent, or Firm—Townsend & Townsend

[57] ABSTRACT

A medication-dispensing card having a plurality of sealed compartments for holding single doses of medication. An inner pack, which provides a moisture and oxygen barrier to preserve the medication, comprises a blister sheet having a plurality of pockets for receiving the individual doses and a frangible lidding sheet laminated to the blister sheet for sealing the pockets. The inner pack is supported between front and back panels which are fastened to each other but not to the inner pack. The panels form a relatively rigid card which may be stored in the file drawer of a mobile medication cart. The structure allows unused medication in the inner pack to be recovered from the card without breaking the seal of an individual compartment permitting reuse. The blister sheet of the card is specially adapted so that the sheets may be stacked without adjacent sheets adhering to each other. Moreover, the pockets formed in the blister sheet have a unique shape chosen to receive a wide variety of pill sizes with minimal excess volume. Also, the lidding sheet is adapted to be fed through an automatic printer so that information may be imprinted on the individual compartments.

17 Claims, 9 Drawing Figures

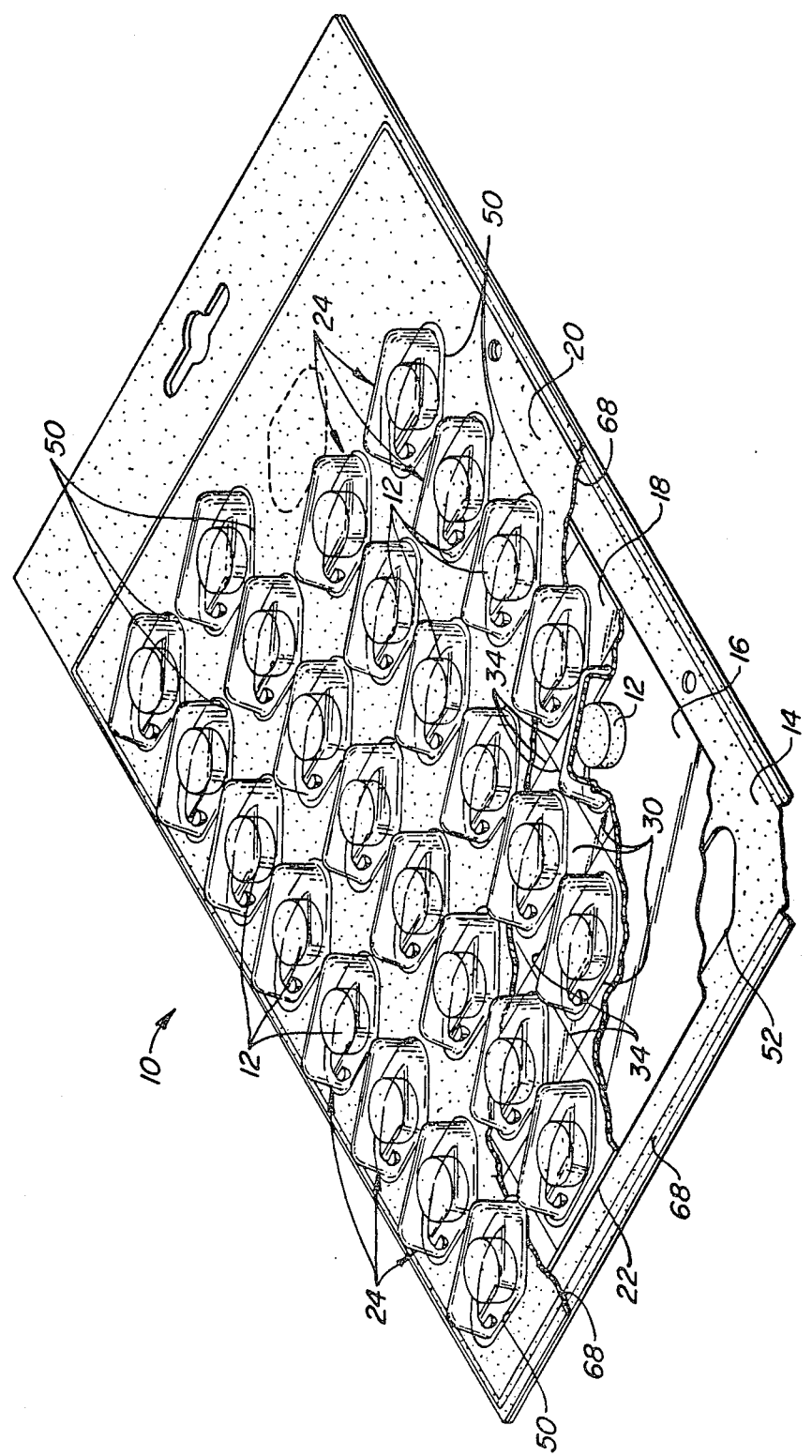
FIG._1.

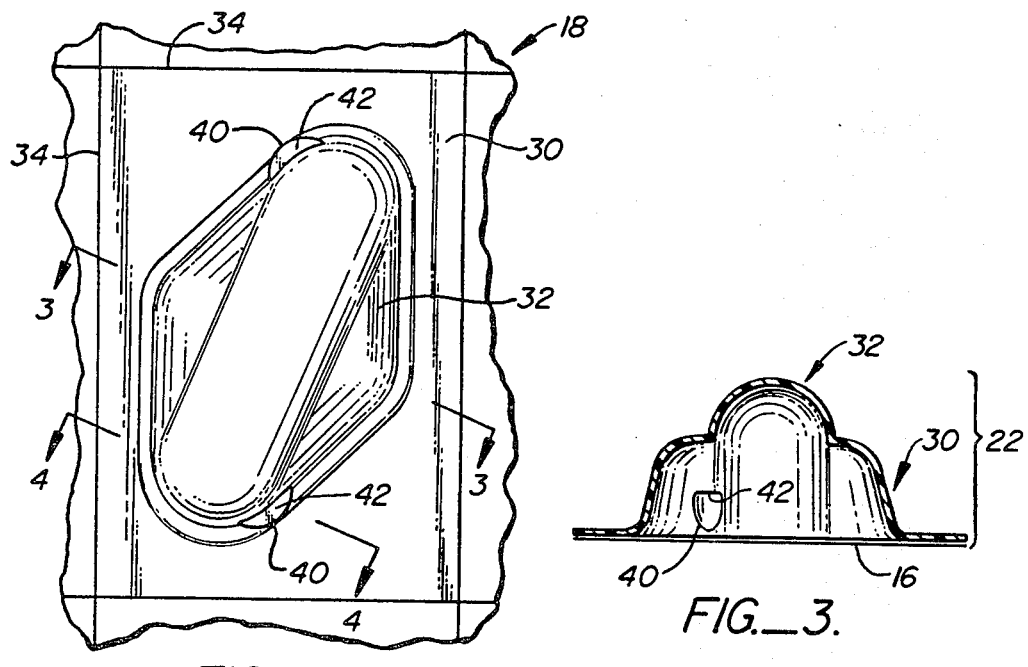
FIG._2.
FIG._3.
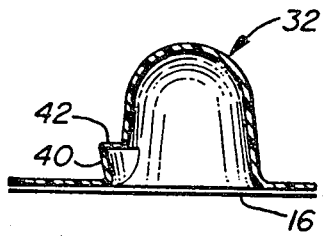
FIG._4.
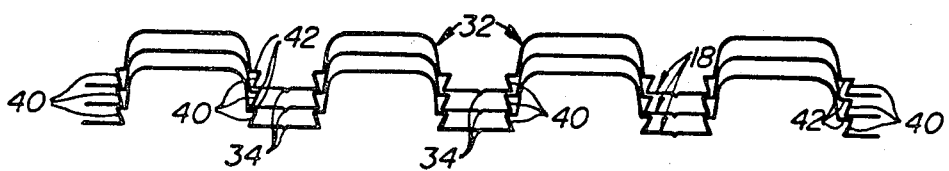
FIG._5.

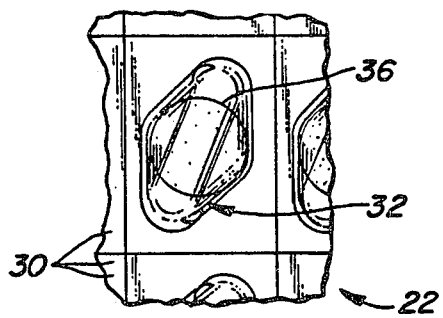
FIG._6A.
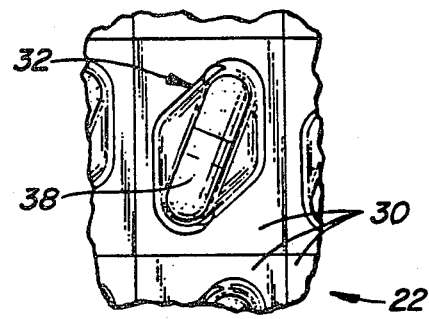
FIG._7A.
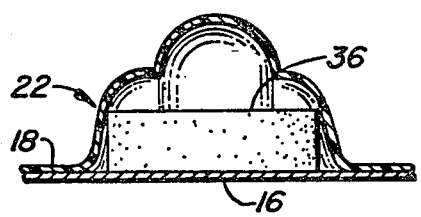
FIG._6B.
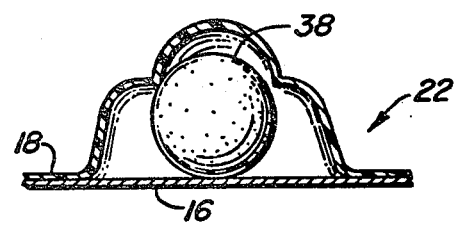
FIG._7B.
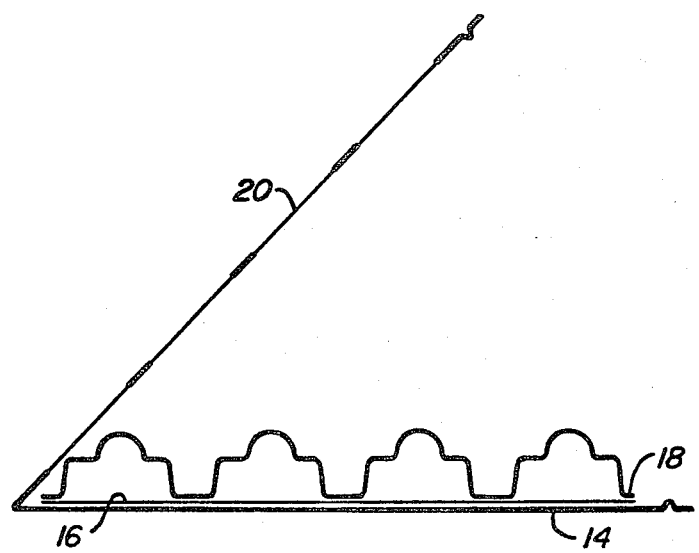
FIG._9.

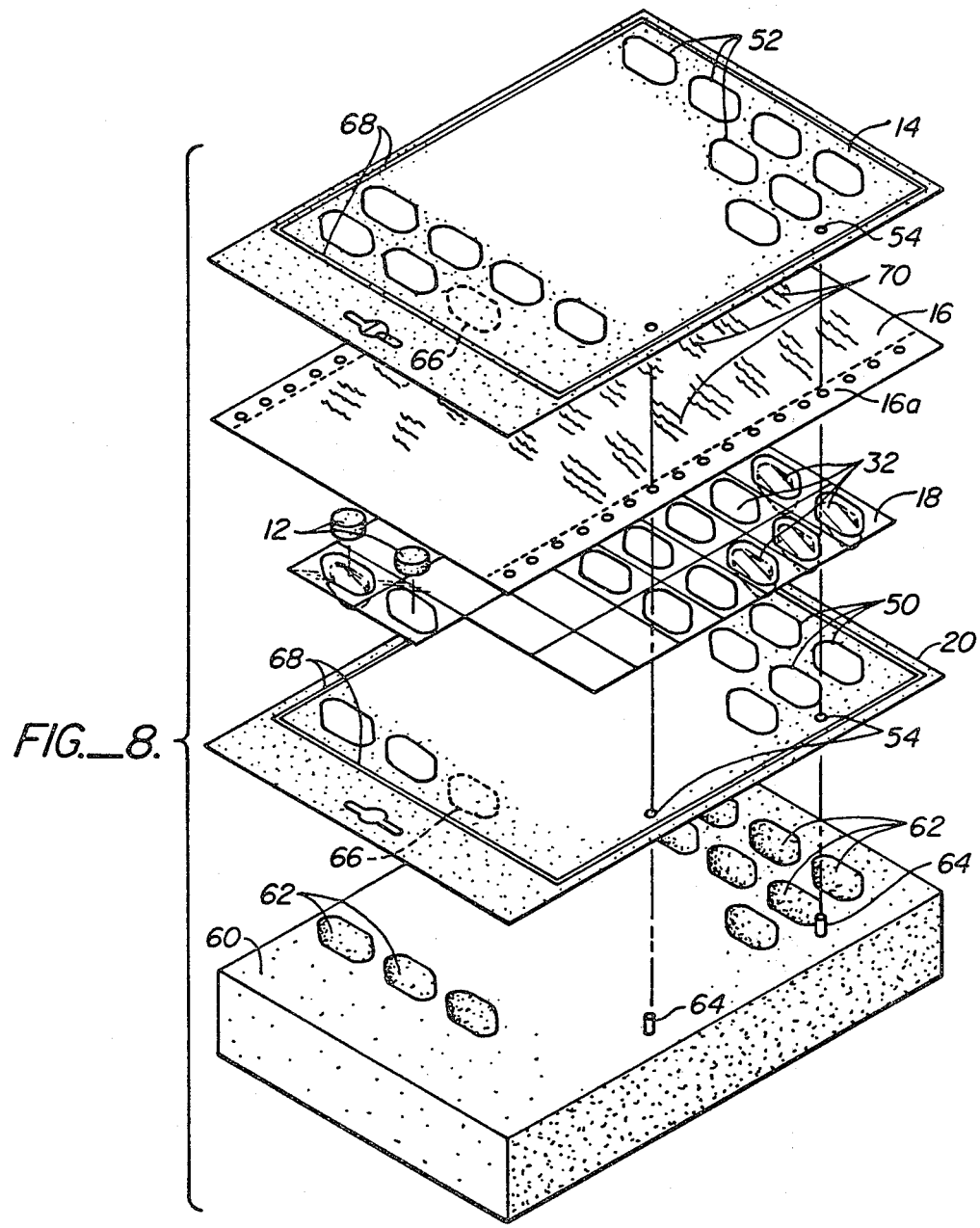
FIG._8.

MEDICATION-DISPENSING CARD

This application is a continuation-in-part of copending prior application Ser. No. 301,086 of Jacob M. Machbitz for MEDICATION-DISPENSING CARD filed on Sept. 11, 1981, now abandoned.

FIELD OF THE INVENTION

Dispensing of medicines in large institutions requires extreme precautions to ensure that each patient receives the correct drug and dosage. Since many patients may receive more than one drug and each drug may involve more than one tablet or capsule, the opportunity for error is very great. Where manual dispensing is employed individually by a nurse during rounds, substantial diversions can occur and careful attention and repeated checking of the drug(s) given to the patient is required. There is, therefore, need for a system which allows for central packaging of drugs directed toward individual patients, so that the person administering the drug need only check a particular name or identifying code to know that the proper drug and dosage is being given to the correct patient.

There is a further interest in being able to recover drugs which have not been used and have hitherto been discarded.

DESCRIPTION OF THE PRIOR ART

U.S. Pat. No. 4,158,411 describes a pill dispensing card having a paperboard backing with a plurality of punchout lids for releasing the medicine therein. U.S. Pat. No. 3,472,367 discloses a quick-opening pill packaging having a backing which is reinforced with ribs and scored to facilitate opening the pack. U.S. Pat. No. 2,878,061 discloses a multi-layer deodorant package which may be peeled open to expose the solid-phase deodorant.

SUMMARY OF THE INVENTION

The present invention provides a medication-dispensing card where unused medication can be recovered in individual sealed compartments, which compartments may then be repackaged in a new card together with freshly packaged medicine. The card of the present invention comprises an inner pack for holding and preserving the medication and an outer cover which supports and protects the inner pack. The inner pack includes a blister sheet having a plurality of pockets formed therein for receiving individual doses of medication. Typically, the sheet will be scored in a grid pattern allowing individual pockets to be easily separated from the remainder of the sheet. The inner pack is completed by a lidding sheet formed from thin, frangible material and laminated to the blister sheet to seal the medication in the pockets. The outer cover comprises front and back panels which hold the inner pack therebetween and define the "card" structure. The panels are secured to one another, but not to the inner pack, so that the portion of the inner pack which contains undispensed medication may be recovered intact by separating the panels. The medication, which is still sealed inside individual compartments, may be separated from the remainder of the inner pack and repackaged inside a new outer cover together with freshly packaged medication.

An alternative embodiment of the present invention is intended particularly for out-patient use where the patient periodically visits the pharmacy to have one or more prescriptions filled. Using the medication-dispensing card of the present invention, the pharmacist may fill the individual pockets of the card with the prescription(s) in the sequence in which they are to be taken. Information specific to each dose, particularly the nature of the medication and the date and time at which it should be taken, is printed on the lidding sheet, typically by automatic printing means, before the lidding sheet is laminated to the blister sheet. The patient is then easily able to determine which medication(s) he should be taking at any time and also able to verify that particular doses have, indeed, been taken. In the alternate embodiment, it is preferred that the outer cover be permanently laminated to the inner pack so that the card may be separated into smaller units which may be conveniently carried by the patient for use over a predetermined time period, e.g., half-day, day or week. With such permanently-laminated cards, only one panel is necessary to provide the required support.

BRIEF DESCRIPTION OF THE DRAWINGS

FIG. 1 is a perspective view of the medication-dispensing card of the present invention with portions broken away.

FIG. 2 is a plan view of a single compartment shown in detail.

FIG. 3 is a sectional view taken along line 3—3 in FIG. 2.

FIG. 4 is a sectional view taken along line 4—4 in FIG. 2.

FIG. 5 is an elevational view of a plurality of blister sheets stacked, shown in section.

FIGS. 6A and 6B illustrate the placement of a tablet in the compartment of the present invention.

FIGS. 7A and 7B illustrate the placement of a capsule in the compartment of the present invention.

FIG. 8 is an exploded view illustrating the assembly of the medication-dispensing card of the present invention.

FIG. 9 illustrates an alternate configuration of the panels of the present invention.

DESCRIPTION OF THE SPECIFIC EMBODIMENT

The subject invention is a medication-dispensing package including a plurality of sealed compartments for dispensing single doses of medication one at a time. The package includes two layers: a first layer (referred to hereinafter as an "inner pack") which protects the medication against moisture and oxidation, and a second layer (referred to hereinafter as an "outer cover") which provides a relatively rigid supporting structure in the form of a card for easy storage.

The inner pack comprises a plurality of open-ended receptacles formed in a clear plastic sheet (referred to hereinafter as a "blister sheet") and a frangible backing (referred to as a "lidding sheet") for laminating to the plastic sheet and sealing the receptacles. It is preferred that the receptacles be arranged in a predetermined pattern and that individual receptacles be separable into like-sized units which may be recovered from a partially-used card and placed into a new outer pack.

The receptacles are typically thermally formed cavities pressed into a flat plastic sheet. It is preferred that the cavities have a multiple-tier structure corresponding to at least two different pill sizes. In this way, the medication-dispensing card can receive different sizes of medication with minimum excess volume in the receptacle. Excess volume can cause degradation of the medication through oxidation and breakage resulting from jarring.

The outer cover comprises two panels, each including a plurality of aligned apertures arranged in a pattern corresponding to that of the receptacles in the inner pack. The apertures in one panel will be adapted to receive the receptacles therethrough, while the apertures in the second panel will be sized to allow medication to be ejected therethrough. In this way, medication can be dispensed from the inner pack when it is encased in the outer cover by merely applying pressure to the plastic receptacle and ejecting the medication through the lidding sheet and out the aperture.

The inner pack is held within the outer cover for support and protection, but the pack and cover are not attached to each other in any way. Thus, the inner pack may be recovered by separating the panels of the outer pack. Individual receptacles which contain remaining medication may then be broken off from the inner pack without disturbing the seal formed by the lidding sheet. The receptacles may then be placed in a new outer cover for reuse.

Referring to FIG. 1, a medication-dispensing card 10 for storing a plurality (up to thirty-one in the particular embodiment) of single doses 12 of medication, such as pills, tablets, capsules and the like, is illustrated. The card 10 comprises four layers: a back panel 14, a lidding sheet 16, a blister sheet 18 and a front panel 20. As will be described in more detail hereinafter, the lidding sheet 16 and the blister sheet 18 are laminated to one another to form an inner pack 22 having a plurality of sealed compartments 24 for protecting the medication. The inner pack 22 is supported between the back and front panels, 14 and 20, respectively, which define the rigid supporting structure of the medication-dispensing card 10.

Referring now also to FIGS. 2-5, the blister sheet 18 is a flat sheet of plastic uniformly divided into a plurality of tabs 30 arranged in rows and columns (as illustrated in FIG. 2). Each tab 30 includes a single pocket 32 formed therein. The tabs 30 are defined by scores 34 arranged in a grid pattern on the sheet. The scores 34 partially penetrate the sheet and allow individual tabs 30 to be removed from the inner pack 22 by simply tearing along the score. The tabs 30 will typically have identical dimensions, allowing unused tabs to be removed from a partially-used card and placed in a new card, as will be discussed in more detail hereinafter.

The pocket 32 formed in each tab 30 has a particular shape chosen to accomodate the variety of medication shapes and sizes. The shape is chosen to minimize the excess volume within the resulting compartment 24, regardless of the shape of the pill or capsule therein. In this way, the medication is less subject to oxidation and breakage resulting from jarring, as discussed hereinabove.

Specifically, the pocket 32 defines a first space which is generally diamond-shaped and intended to hold disk-shaped medication, such as tablet 36 illustrated in FIGS. 6A and 6B. The pocket 32 also defines a generally cylindrical space extending the length of the pocket 32. The cylindrical space is intended to hold elongate medicine, such as capsule 38 illustrated in FIGS. 7A and 7B. By adapting the pocket 32 to more than one shape of medication, the inventory requirement for the user is reduced. Furthermore, the rounded walls of the packet can hold a variety of different shaped medication relatively snugly to prevent movement of the medication in the packet.

Prior to use, the blister sheets 18 will normally be stacked with the pockets 32 nesting in one another. In order to prevent the sheets 18 from tightly nesting so that they are difficult to separate, a pair of shoulders 40 are formed in the pocket 32, as best illustrated in FIGS. 2-4. Each shoulder 40 is slightly undercut so that its upper surface 42 projects laterally (to the left in FIG. 4) beyond its base. Such an undercut shoulder 40 allows the blister sheets 18 to be stacked for shipment and storage as illustrated in FIG. 5, while maintaining a space between adjacent sheets so that they will not adhere.

The blister sheet 18 is formed from a clear flexible plastic material chosen to provide an adequate moisture and oxygen barrier for the particular application. Typically, polyvinyl chloride sheets, having a thickness in the range from 7.5 to 10 mils., are adequate. If a greater barrier is desired, the blister sheet 18 may be formed of other materials, such as polypropylene and the like, which better prevent oxygen and moisture penetration. The pockets 32 and scores 34 are thermally pressed into the flat sheets of the chosen plastic material to form the blister sheet 18.

The lidding sheet 16 is laminated to the blister sheet 18 (after the medication 12 has been inserted into the pockets 32) to form the inner pack 22. The lidding sheet is typically formed from aluminum foil, having one side of the foil material coated with a heat-activated (or pressure-activated) adhesive and the other side treated to receive printing, conveniently by bonding a thin layer of paper thereto. The thickness of the foil is chosen based on the desired strength of the material, rather than the moisture penetration characteristics, since even very thin aluminum provides an adequate barrier. Desirably, foil is employed which is strong enough to withstand the stress imparted by an automatic printer (as described hereinbelow) and yet is frangible so that pills 12 can be ejected therethrough and the foil will tear as the compartments 24 of the inner pack 22 are separated along the scores 34 in the blister sheet 18. A thickness of approximately 0.5 and 0.75 mils has been found adequate.

As discussed hereinafter, it is preferred that the lidding sheets 16 be adapted to be fed through an automatic printer. This may be accomplished by providing such lidding sheets 16 in a continuous roll having perforated margins 16a (see FIG. 9) for feeding through a sprocket-type printer (not shown). In this way, individualized information and instructions can be printed onto the exposed side of the lidding sheet 18 by automatic means, saving the user a great deal of time. Furthermore, by using a sprocket-type printer, the position of information can be precisely aligned with the desired compartment 24.

The front and back panels 20,14 are provided to encase the relatively fragile inner pack 22 for use by the patient or drug disseminator. The panels 20 and 14 are typically rectangular having dimensions chosen to allow their insertion into medical carts (not shown) such as those used in hospitals and nursing homes. The panels 20 and 14 will typically be formed from paper board, although reusable panels formed from plastic or other materials may be employed.

Referring to FIGS. 1 and 9, the front panel 20 includes a plurality of apertures 50, each having dimensions adequate to allow the pockets 32 to be inserted therethrough. The back panel 14 is formed similarly to the front panel and includes a like number of apertures 52. Although the apertures 50 and 52 need not be of the same size, they typically will be. The apertures 52 in the back panel 14 are large enough to allow the pill in the associated compartment 24 to be ejected therethrough and to permit and printed legend to be unobscured. Both the front and back panels 20 and 14 include alignment holes 54 which are used in assembling the card 10, as will now be described.

Referring to FIG. 8, the cards 10 are preferably assembled on an assembly board 60 having a plurality of cavities 62 arranged in a pattern similar to that of the pockets 32 in the blister sheet 16. The cavities 62 are sufficiently large to receive the pockets 32 therein. The assembly board 60 also includes a pair of alignment pegs 64 for receiving the holes 54 in the front and back panels 20,14 in order to properly align those panels during assembly.

In assembling the card 10, the front panel 20 is first placed down so that the holes 54 are received on the pins 64. Next, a blister sheet 16 is placed on top of the front panel 20 so that the pockets 32 project downward through the apertures 50 and into the cavities 62. At this point, the pharmacist or other user places the desired number of doses 12 into the individual pockets 32. The number of doses depends on the particular prescription, and the card may be only partially filled. The embodiment shown, having up to thirty-one compartments 24, is particularly adapted for prescriptions which are filled on a monthly basis where the patient takes the medication once a day.

Referring again to FIG. 1, thirty apertures 50 and 52 are formed in both the front and back panels 20 and 14. A space for a thirty-first aperture, corresponding to a month with 31 days, is provided at location 66 in each panel (FIG. 1) where a perforated insert may be removed to receive an additional pocket 32. The blister sheets 18 come typically with thirty-two tabs 30 formed therein, and the user may break off the desired number of tabs, typically 30 or 31, and insert that number into the front panel 20 on the assembly board 60, as described hereinbefore.

After the desired number of pills 12 have been placed in the pockets 32, the lidding sheet 16 is placed with its adhesive surface downward against the blister sheet 18. The lidding sheet 16 is aligned properly by inserting the pegs 64 through the appropriate sprocket holes in the performated margin 16a. The user seals the lidding sheet 16 to the blister sheet 18 by placing a heating element (not shown) against the exposed face of the lidding sheet 18. In this way, the lidding sheet 16 and blister sheet 18 are laminated to form an air and moisture proof seal to prevent degradation of the medication. Typically, the perforated margins 16a are not coated with the adhesive and will be removed after lamination.

The user next places the back panel 14 on top of the lidding sheet 16 so that holes 54 are received on the pegs 64. In order to be able to recover and use medication from the inner pack 22, it is necessary that the front and back bottom panels 20 and 14 be secured to one another without attaching to the inner pack. This may be accomplished by attaching the edges of the panels 20 and 14 which extend beyond the periphery of the inner pack 22. The edges may be secured in a variety of ways such as snaps, staples, glue, and the like.

In the specific embodiment, means are provided along the edge of both panels for heat sealing the edges together. Specifically, a narrow ridge or boss 68 (FIGS. 1 and 8) is formed along the interior surface at the edge of both panels. The bosses 68 are carefully aligned so that they will meet when the card 10 is assembled on the assembly board 60. Moreover, the combined thickness of the bosses 68 corresponds to the thickness of the inner pack 22 so that the card 10 is not distorted when the edges of the panels 20,14 are secured. Typically, the boss 68 will be coated with a heat-activated glue and the card may be finally assembled by applying heat with the same heating element used to laminate the lidding sheet 16 to the blister sheet 18.

Referring now to FIG. 9, the top and bottom panels 20 and 14 respectively may be hinged along a common edge to aid in assembling the card 10. The primary advantage to hinging the panels 20 and 14 together is that, although the top and bottom panels are similar, they are mirror images of one another and can easily be confused. Such confusion can lead to wasted time and panels.

Medication may be dispensed from the card 10 of the present invention by applying pressure to the top of the pocket 32 and ejecting the medication 12 therein through the frangible lidding material 16 and outward through the aperture 52 in the back panel 14. Thus, single doses 12 of the medication may be dispensed as frequently as desired while the remaining medication remains protected within the inner pack 22 of the card 10.

A significant advantage of the card 10 of the present invention is that the unused doses 12 of medication may be recovered from the card and placed in a similar card for reuse by the same or another patient. This results in a substantial savings, particularly for hospitals and other institutions where medication can easily be recycled so long as it remains sanitary.

To recover the unused doses 12 it is necessary to first separate the front and back panels 20 and 14 to expose the inner pack 22. After removing the inner pack 22, those tabs 30 which contain the unused medication may be broken off along the scores 34. Since all tabs 30 are like-sized, the unused tabs may be placed in another card 10 at the proper point in the assembly procedure, as described hereinabove. A new blister sheet 18 can then be broken off to fill the remaining spaces in the new card. After filling the pockets 32 in the sheet with the appropriate medication, a new lidding sheet 16 may be placed over the entire assembly, including the recycled tabs 30, and laminated prior to completing the assembly of the new card 10.

The lidding sheet 16 of the present invention is adapted to fed through an automatic printer which may be computer controlled. In this way, the information included on the sheet (as shown at 70 in FIG. 8) may be closely tailored for the individual patient. For example, for each compartment 24, the type of medication, the dosage, and the date on which it is to be taken can be printed. In cases where the medication is taken more than once a day, it is possible even to print out the time of day at which the medication should be taken. With a computer, such a procedure is made easy. The name of the patient and the nature of the prescription need only been entered into the computer once. Then by simply entering the frequency of application, the computer can print the appropriate instructions at the location corresponding to each individual pill in the proper format.

The dispenser need only place the lidding sheet 16 in its proper place in the assembly and complete the card as described hereinabove.

Such detailed labeling of individual doses is particularly valuable where it is contemplated that the unused doses may be repackaged. Each individual dose can be identified with particularity as to type of medicine and its shelf life, and the unused medication may be stored for some time prior to reuse without fear that its nature or age will be forgotten.

Although the foregoing invention has been described in some detail by way of illustration and example for purposes of clarity and understanding, it will be obvious that certain changes and modifications may be practiced within the scope of the claims.

What is claimed is:

1. A medication-dispensing card comprising an inner pack for storing single doses of medication prior to use and an outer cover for nonpermanently encasing the inner pack, wherein:
   (a) the inner pack comprises:
      a blister sheet having a plurality of pockets formed therein;
      single doses of medication retained within at least some of the said pockets;
      a lidding sheet laminated to one side of said blister sheet so that the pockets are sealed to protect the medication; and
      means for separating one or more pockets from the remainder of the inner pack in a predetermined grid pattern so that unused doses can be recovered and recycled; and
   (b) the outer cover comprises:
      a front panel lying adjacent the blister sheet and having a plurality of apertures which receive the pockets therethrough; and
      a back panel having substantially the same peripheral dimension as the front panel, said back panel lying adjacent the lidding sheet and having a plurality of apertures arranged in a pattern corresponding to that of the pockets in the blister sheet, said front and back panels being free from means for detaching individual pockets and being characterized by a boss formed along the inner surface of at least one of the panels and disposed near the edge thereof, said front and back panels being attached solely by means of said boss.

2. A card as in claim 1, wherein the means for separating comprises scores formed in the sheet between the pockets, said scores being arranged in a grid pattern so that the sheet is divided into tabs having equal areas.

3. A card as in claim 1, wherein the lidding sheet comprises an aluminum foil layer laminated to a paper layer.

4. A card as in claim 3, wherein the lidding sheet is capable of being fed through a sprocket printer so that instructions may be printed precisely at preselected locations.

5. A card as in claim 1, wherein the top and bottom panels are hinged together along a common edge.

6. A card as in claim 1, wherein the pockets formed in the blister sheet define a volume comprising a first space superimposed over a second space, the dimensions of said first space corresponding to a first shape of medication and the dimensions of said second space corresponding to a second shape of medication.

7. A card as in claim 6, wherein the first space is generally diamond-shaped and the second space is generally cylindrical.

8. A kit for assembling a medication-dispensing card, said kit comprising:
   a blister sheet having a plurality of pockets formed therein for receiving single doses of medication, said blister sheet being scored in a grid pattern so that preselected pockets may be separated from the remainder;
   a lidding sheet including means on one side for bonding to the blister sheet to seal the pockets and form an inner pack;
   a front panel having apertures arranged in a pattern corresponding to that of the pockets in the blister sheet, each of said apertures having dimensions sufficient to receive the pockets therethrough;
   a back panel having substantially the same peripheral dimensions as the front panel and having apertures aligned with said front panel and of dimensions sufficient to allow expulsion of the doses of medication therethrough, said front and back panels being free from means for detaching individual pockets; and
   means for securing the front and back panels to encase said inner pack said means comprising a boss formed along the inner surface of at least one of the panels and disposed near the edge thereof so that boss encompasses the inner pack when the panels are brought together.

9. A kit as in claim 8, wherein the lidding sheet comprises an aluminum foil layer laminated to a paper layer.

10. A kit as in claim 9, wherein the lidding sheet is capable of being fed through a sprocket printer so that instructions may be printed precisely at preselected locations.

11. A kit as in claim 8, wherein the top and bottom panels are hinged together along a common edge.

12. A kit as in claim 8, wherein the pockets formed in the blister sheet define a volume comprising a first space superimposed over a second space, the dimensions of said first space corresponding to a first shape of medication and the dimensions of said second space corresponding to a second shape of medication.

13. A kit as in claim 12, wherein the first space is generally diamond-shaped and the second space is generally cylindrical.

14. A method for recovering unused medication from a medication-dispensing card comprising an inner pack for storing single doses of medication prior to use and an outer cover for nonpermanently encasing the inner pack, wherein:
   (a) the inner pack comprises:
      a blister sheet having a plurality of pockets formed therein;
      single doses of medication retained within at least some of the said pockets;
      a lidding sheet laminated to one side of said blister sheet so that the pockets are sealed to protect the medication; and
      means for separating one or more pockets from the remainder of the inner pack so that unused doses can be recovered and recycled; and
   (b) the outer cover comprises:
      a front panel lying adjacent the blister sheet and having a plurality of apertures which receive the pockets therethrough; and a back panel having substantially the same peripheral dimensions as the front panel, said back panel lying adjacent the lidding sheet and having a plurality of apertures arranged in a pattern corresponding to that of the pockets in the blister sheet, said front and back panels being characterized by a boss formed along the inner surface of at least one of the panels and disposed near the edge thereof, said front and back panels being attached solely by means of said boss;

said method comprising separating the top and bottom panels and removing the inner pack from therebetween.

15. A method for recovering and repackaging unused medication from a medication dispensing card comprising:
an inner pack for storing single doses of medication prior to use and an outer cover for nonpermanently encasing the inner pack, wherein:
(a) the inner pack comprises:
a blister sheet having a plurality of pockets formed therein;
single doses of medication retained within at least some of the said pockets;
a lidding sheet laminated to one side of said blister sheet so that the pockets are sealed to protect the medication; and
means for separating one or more pockets from the remainder of the inner pack so that unused doses can be recovered and recycled; and
(b) the outer cover comprises:
a front panel lying adjacent the blister sheet and having a plurality of apertures which receive the pockets therethrough; and
a back panel having substantially the same peripheral dimensions as the front panel, said back panel lying adjacent the lidding sheet and having a plurality of apertures arranged in a pattern corresponding to that of the pockets in the blister sheet, said front and back panels being characterized by a boss formed along the inner surface of at least one of the panels and disposed near the edge thereof, said front and back panels being attached solely by means of said boss, said method comprising separating the top and bottom panels of a partially used medication-dispensing card, removing the inner pack from therebetween, separating the used and unused medication pockets, and replacing the unused medication pockets within a new outer cover.

16. A method for assembling a medication-dispensing card, said method comprising
placing single doses of the medication into at least some of a plurality of pockets formed in a blister sheet;
sealing the medication within the pockets by laminating a lidding sheet to one side of the blister sheet to form a protective pack; and
encasing the protective pack between a front panel having apertures for receiving the pockets therethrough and a back panel having apertures which allow the medication to be ejected, by aligning the panels so that their edges lie adjacent one another and securing the panels along their adjacent edges so that the inner pack remains unattached to either panel.

17. A method as in claim 16, further including the step of imprinting the lidding sheet with information concerning the medication prior to laminating the lidding sheet to the blister sheet.

* * * * *